United States Patent [19]
Coulter

[11] Patent Number: 4,723,450
[45] Date of Patent: Feb. 9, 1988

[54] METHOD AND APPARATUS FOR MEASURING TORQUE

[75] Inventor: Clifton A. Coulter, Westminster, Mass.

[73] Assignee: General Electric Company, Schenectady, N.Y.

[21] Appl. No.: 926,941

[22] Filed: Nov. 4, 1986

[51] Int. Cl.⁴ .................................................. G01L 3/14
[52] U.S. Cl. ................................ 73/862.19; 73/862.33
[58] Field of Search .......... 73/862.33, 862.35, 862.36, 73/862.37, 862.22, 862.32, 862.52, 862.19

[56] References Cited

U.S. PATENT DOCUMENTS

| | | | |
|---|---|---|---|
| 2,651,197 | 9/1953 | Crookston et al. | 73/862.37 |
| 2,974,522 | 3/1961 | Bentele et al. | 73/862.37 |
| 3,057,193 | 10/1962 | Wiggermann | 73/862.37 |
| 3,200,624 | 8/1965 | Tix | 73/862.36 X |

Primary Examiner—Charles A. Ruehl
Attorney, Agent, or Firm—Jerome C. Squillaro

[57] ABSTRACT

Apparatus and method for measuring the torque transmitted across coupled rotating shafts using load cells located between power imparting surfaces and power receiving surfaces of shafts rotating jointly about a common axis of rotation for directly determining the tangential driving force and, hence, the torque therebetween. In one form, radially inwardly facing teeth supported by one shaft drivingly couple with radially outwardly facing teeth supported by the other shaft. Load cells at the interface between the teeth of the two shafts provide signals representative of the torque, or torque variations.

11 Claims, 3 Drawing Figures

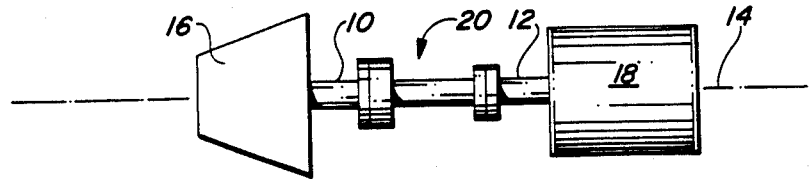
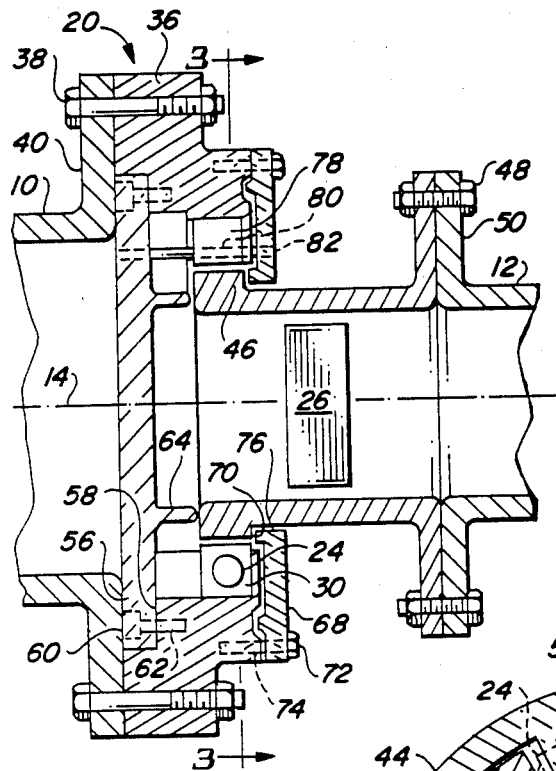
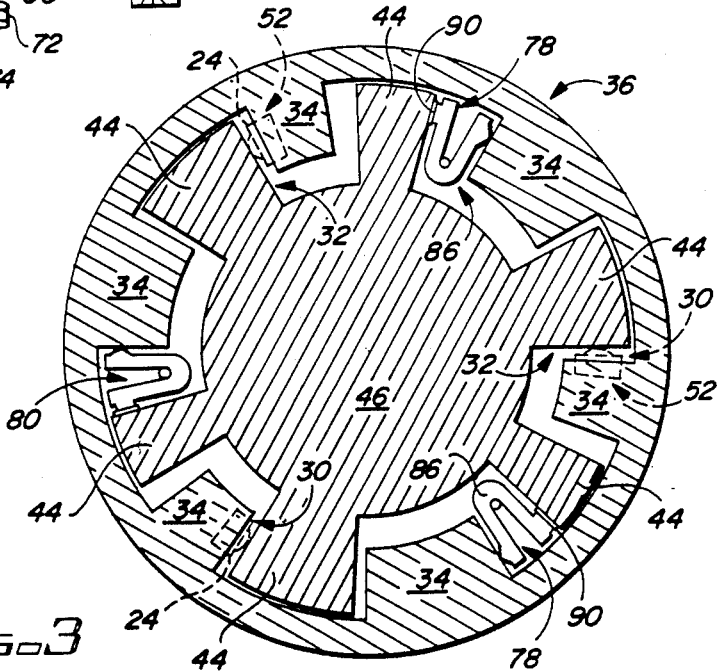

METHOD AND APPARATUS FOR MEASURING TORQUE

BACKGROUND OF THE INVENTION

This application is related to commonly assigned application Ser. No. 06/926,940 filed concurrently herewith.

This invention relates to a method and apparatus for measuring torque transmitted across coupled rotating shafts and, more particularly, to torque measuring using load cells located between power couplings of coaxially rotating shafts for directly determining the tangential driving force at such couplings.

DESCRIPTION OF THE PRIOR ART

Many approaches have been attempted in an effort to improve torque measuring couplings that would be applicable to conventional styles of mechanical drive turbines and other machinery. In general, prior art equipment is either difficult to calibrate, has short periods of accurate service, or is of low accuracy although having a long service life. Furthermore, such prior art torque measuring devices measure torque indirectly, for example, by determining either the angular deflection of a drive shaft or by measuring the torsional stress in a torque transmitting member. Since the measured values are very small numbers, inaccuracies may occur when attempting to measure relatively large force and torque values. Further, since one of the requisites of a successful design is to maintain a high torsional stiffness in order to minimize the impact on torsional resonance, it is obvious that the attempt to measure infinitesimal deflections is difficult. Attempts to measure torque to within +/−¼% accuracy, using such small deflections, has generally been difficult.

SUMMARY OF THE INVENTION

Among the objects of the present invention is the provision of a method and apparatus for the measurement of torque transmitted through a rotating coupling with high accuracy, sensitivity and reliability. These and other objects are attained in an illustrative embodiment in a torque coupling mechanism between a driving shafts and a driven shaft. The driving and driven shafts are axially aligned and rotatable together about a common axis of rotation. A plurality of power imparting surfaces are secured with respect to the driving shaft at an equal predetermined distance from the axis of rotation. A plurality of power receiving surfaces are secured with respect to the driven shaft at a distance equal to the above mentioned predetermined distance. Load cells are positioned at interfaces between a predetermined number of the power imparting and power receiving surfaces to directly sense the tangential driving force therebetween when such load cells and adjacent power surfaces are moved into engagement through the rotation of the shafts. Electronic means are responsive to the predetermined distance, the number of load cells, and the sensed tangential driving force to determine the torque developed between the driving shaft and the driven shaft during their rotation. Each of the shafts includes radially extending teeth with radially extending surfaces which constitute the power imparting and power receiving surfaces. Further included are resilient means to urge the power imparting and power receiving surfaces away from each other so that the load cells will only begin sensing the tangential driving force after a predetermined torque has been developed between the rotating shafts. Also included are shims to vary the spacings between the resilient means and their adjacent power surfaces to thereby calibrate the system to the anticipated torque.

BRIEF DESCRIPTION OF THE DRAWINGS

For a more complete understanding of the nature, objects and advantages of the present invention, reference should be had to the following detailed description taken in conjuction with the accompanying drawings wherein:

FIG. 1 is an elevational showing of torque measuring apparatus constructed in accordance with the principles of the present invention, applied between a driving machine and a driven machine.

FIG. 2 is a sectional view of the torque measuring apparatus shown in FIG. 1 taken along the axis of rotation; and FIG. 3 is a sectional view of the torque measuring apparatus shown in FIGS. 1 and 2 taken along line 3—3 of FIG. 2.

DETAILED DESCRIPTION OF THE INVENTION

Referring generally to FIGS. 1, 2 and 3, two shafts 10 and 12 are coupled for conjoint rotation about a common axis of rotation 14. Shaft 10 represents a driving shaft extending from a turbine 16 or other prime mover. Shaft 12 represents a driven shaft coupled to a load 18 to be powered. The shafts 10 and 12 are coupled together by an intermediate member or coupling apparatus 20. Within the coupling apparatus are a plurality of symmetrically positioned load cells 24, three in the preferred embodiment, although any number could be utilized, for sensing and determining the circumferential or tangential driving force between the shafts during rotational operation. The load cells 24 are commercially available sensors which generate an output signal proportional to compressive force applied thereto. Any of the well known types of sensors can be used, including those requiring electrical excitation. The load cells 24 may be coupled to a rotating transmitter 26 and power source, if required, such as a rotating battery pack or rotating transformer fitted with a centrifugal switch within the coupling apparatus 20 for operation during rotation of the shafts. Remote electronic transducing equipment, not shown, but of a type well known in the art, receives the variable output information from the load cells 24 through radio telemetry equipment or other electrical coupling components such as slip rings, also well known in the art. The transducing equipment integrates such variable information from the load cells with the number of load cells, the distance from the load cells to the axis of rotation, and an appropriate mathematical constant and provides a readout representing the torque generated between the shafts. Shaft rotational speed can be measured by any conventional method, such as, for example, by use of a pulse counter, a tachometer coupled to the shaft or other means well known in the art. The torque may be multiplied by the rotational velocity of the load cells obtained from the measured shaft speed and divided by an appropriate mathematical constant to provide a readout representing the horsepower transmitted. The electronic equipment may comprise a receiver, amplifier and other circuitry necessary to convert the signal from the load cell 24 into indications of torque. A microprocessor based or microcomputer system is readily implemented and allows variation and selection of parameters to accommodate different load cells and different distances between the axis of rotation and load cells. The transmission and collection of data from the load cells 24 and the conversion of such data to measurement of torque can be implemented by several conventional techniques which will be readily apparent to those ordinarily skilled in the art.

Any modulation of the signal, i.e., the instantaneous torque signal, obtained from this system is indicative of torque or horsepower transients, and spectrum analysis of the data may be used to detect torsional resonant conditions. The average value of the signal is representative of the steady state torque.

In the illustrative embodiment, the coupling apparatus 20 comprises a first intermediate or exterior cylindrical member 36 having a plurality of tooth-like members 34 extending radially inwardly and a second intermediate or interior cylindrical member 46 having a corresponding plurality of tooth-like members 44 extending radially outward. As best seen in FIG. 3, the tooth-like members 34 intermesh with the tooth-like members 44. For clarity and simplicity, the members 34, 44 will sometimes be referred to as "teeth". The exterior member 36 is fastened to a flange 40 at an end of the driving shaft 10 while the interior member 46 is fastened to a flange 50 at an end of driven shaft 12. A plurality of bolts 38, 48 may be used for securing flanges 40, 50, respectively, to the corresponding members 36, 46.

The load cells 24 are positioned in recesses 52 formed in load bearing or power imparting faces or surfaces 30 of depending tooth-like members 34. Facing each surface 30 is a corresponding load or power receiving surface 32 on extending tooth-like member 44. Torque and power are transferred from the driving shaft 10 to the driven shaft 12 by contact between the surfaces 30, 32. Either of the shafts 10 or 12 may be formed directly and integrally with their teeth 34 and 44 and power surfaces 30 or 32. Alternatively, either of the shafts 10 or 12 may be formed to indirectly support their teeth 34 and 44 and power surfaces 30 or 32 as through intermediate coupling apparatus 20 as described above.

Each such power imparting and receiving surface is positioned essentially parallel with, radially with respect to, and at a predetermined distance from, the axis of rotation. Together the power surfaces 30 and 32 are mutually positioned to transmit a tangential shaft-driving force, normal with respect to the axis of rotation 14. The force is transmitted between the power surfaces through the load cells 24, which cells directly sense the magnitude of such tangential driving force.

It is preferred that the power imparting surfaces 30 be provided with recesses 52, as best seen in FIG. 3, in the faces of the inwardly extending tooth-like members 34 with the load cells 24 being positioned in the recesses. In this manner an unanticipated overload condition will not harm the load cells since the surface 30 of the radially inward extending teeth would contact the adjacent power receiving surfaces 32 and limit excess compression of the load cells 24 to thus preclude damage to the load cells through crushing. (The reader will recognize that since power is transmitted through the load cells 24 under normal conditions, the only portion of surface 30 which transmits force during normal operation is that portion at the bottom surfaces of the recesses 52. The remaining portion of the surfaces 30 only transmit power in the event of a sudden overload which compresses the cells 24 below surface 30.) Alternatively, the load cells may be arranged to be self-protecting from excessive deformation.

The coupling apparatus 20 includes a plate 56 removably coupled to a face 58 of the external cylindrical member 36 as by bolts 60 and threaded apertures 62. The plate 56 is positioned adjacent flange 40 and has axially extending finger means 64 in a cylindrical configuration to limit axially inboard movement, i.e., toward shaft 10, of the interior cylindrical member 46, its teeth 44 and driven shaft 12. The coupling apparatus 20 also includes an outer plate 68 removably coupled against an outer face 70 of the interior cylindrical member 46. The plate 68 is attached to an outer surface of member 36 by bolts 72 in threaded apertures 74. The plate 68 is of a ring-like shape through which the inner cylindrical member 46 extends and has axially extending finger means 76 in a cylindrical configuration which contact lower or inner faces of members 44 to limit axial movement of the interior cylindrical member 46. While axial movement of member 46 is shown as constrained by plates 56, 68, it will be appreciated that other mechanical arrangements could be employed for the same purpose.

Resilient members, such as, for example, U-shaped springs 78 are located at selected interfaces between the teeth 34 and 44 remote from the load cells 24. The springs 78 tend to resist the movement of the power receiving surfaces 32 into operative engagement with the load cells 24 until a predetermined torque has been reached. As a result, the load cells actually only sense tangential driving forces over a controlled force range. The resilient springs 78 are U-shaped and operate in association with pins 80 extending through, and press fit in, apertures 82 in the outboard and the inboard plates 56 and 68 and adjacent a bight 86 of the springs 78. In this manner, inadvertent movement of the springs, especially during set up, is eliminated. The arrangement of the apparatus during set up also includes the incorporation of adjustable shims 90, positionable between the springs 78 and an adjacent power surface. The shims function with the springs 78 and load cells 24 to calibrate the system. Note is taken in FIG. 3 that the teeth 34 and 44 are of essentially symmetrical configuration but are of unequal circumferential extent or size in order that the springs and shims may be accommodate in their proper positions in the spaces between adjacent teeth.

The feature of the springs and shims with the load cells effectively permits the incorporation of a "suppressed zero" capability into the system thereby permitting a low gradient load cell to be employed in the useful range. For example, if one were measuring a tangential driving force in the approximate range of 5,000 to 7,000 pounds, greater accuracy could be obtained if the load cell did not perceive any load until an initial tangential driving force of 4,000 pounds, for example, had been developed. When the magnitude of the zero suppression can be adjusted by some simple mechanism such as the above described shim, or by an adjusting screw or the like, the whole device may be readily calibrated or tailored for a given application. It should be noted that other forms of resilient members can be used but that such members must exhibit only modest deflection in order to maintain adequate torsional stiffness. Furthermore, the incorporation of resilient members 78 and the suppressed zero function described above will be recognized as useful but not absolutely necessary. Force sensing using load cells of broader range could be implemented where the range is small or such load cells available.

To insure accurate torque measurements, it is common practice to apply torque meters between 70% and 100% of full capacity. With current torque meter designs, this requires replacement of the entire coupling to match the actual equipment torque to the useful range of the torque meter. The present system facilitates the matching of the torque meter to the equipment since the entire coupling may be maintained constant and only the load cells, selected from a family of load cells, are changed to adjust the system for accommodating different operating conditions.

One of the problems confronting a user of such above-described equipment is that of calibration drift, or change of reading, due to centrifugal effects when the unit is at speed. Calibration at standstill may be accomplished with a simple balanced lever arrangement which applies a true torque of known magnitude. A simulated torque that deflects the load cell can be developed by compressing the load cell to produce a load cell distortion comparable to that developed by a torque load while unloaded operation at speed can indicate the magnitude of the centrifugal effect, if any. Such methods for calibrating load cells are well known in the art.

The question of torsional stiffness must also be considered in the design of any torque measuring system. Conventional couplings of the type normally employed in mechanical drives may have a deflection of about 15 minutes of arc at the rated load. At a six inch radius this amounts to about 0.026 inches, far greater than the deflection required for a good measurement of tangential driving force. The torsional stiffness of the above-described apparatus, therefore, will not have a serious effect on torsional resonance during operation and use. In addition, long term stability of the above-described apparatus can readily be demonstrated at standstill by introducing an artificial but precise torsional displacement of the unit similar to that employed in verifying the centrifugal effect of rotation.

The above-described apparatus with its shafts 10 and 12 is thus illustrative of a system capable of carrying out a new method of measuring torque between the driving shaft 10 and the driven shaft 12 rotating together about a common axis of rotation 14. Such method comprises the steps of providing a plurality of power imparting surfaces 30 and power receiving surfaces 32 secured with respect to the driving and driven shafts 10 and 12. These surfaces are at an equal predetermined distance from the axis of rotation. Each such power imparting and receiving surface is positioned or located essentially parallel with, radially with respect to, and at a predetermined distance from, the axis of rotation. The surfaces are thus adapted to transmit a tangential driving force with respect to the axis of rotation during operation and use. The method also includes the step of positioning a predetermined number of load cells 24 at the interfaces between power imparting surfaces and power receiving surfaces to transmit the driving force and directly sense the tangential driving force therebetween. The positioning step includes removably inserting the load cells into recesses 52 at the power imparting surfaces 30. The load cells are selected to have a predetermined characteristic as a function of the torque anticipated to be transmitted. The method also includes the step of determining the torque at the interface between the driving shaft and the driven shaft during their rotation as a function of the predetermined distance, the predetermined number of load cells, and the sensed tangential driving force.

The method further includes the optional step of resiliently biasing at least some of the power imparting surfaces and power receiving surfaces away from each other with springs 78 whereby the load cells begin to function only after a predetermined torque has been transmitted. Lastly, the method further includes the step of calibrating the apparatus by varying the spacing between the springs and their adjacent power surfaces by shims 90 or functionally equivalent spacing devices.

While the present invention has been described with reference to a particular embodiment, many modifications and variations will become apparent to those skilled in the art. Accordingly, all such variations and modifications are intended to be included within the scope of the appended claims.

What is claimed is:

1. A system for measuring torque transmitted from a driving shaft to a driven shaft, the driving shaft and the driven shaft being axially aligned and rotatable together about a common axis of rotation comprising:
   a plurality of power imparting surfaces secured with respect to the driving shaft at an equal predetermined radial distance from the axis of rotation;
   a plurality of power receiving surfaces secured with respect to the driven shaft at a radial distance equal to said predetermined distance;
   load cells positioned at interfaces between a predetermined number of power imparting and power receiving surfaces to directly sense the tangential driving force therebetween when such load cells and adjacent power surfaces are moved into engagement through the rotation of the shafts, said load cells providing output signals representative of the torque developed between the driving shaft and the driven shaft during their rotation, and,
   resilient means to urge the power imparting and power receiving surfaces away from each other so that the load cells will only begin sensing the tangential driving force after a predetermined torque has been developed between the rotating shafts.

2. The system as set forth in claim 1 wherein each of the shafts includes radially extending teeth with radially extending surfaces which constitute the power imparting and power receiving surfaces.

3. The system as set forth in claim 2 wherein at least one of the shafts includes an intermediate member with the teeth of that shaft being formed on the intermediate member.

4. The system as set forth in claim 1 and further including shim means to vary the spacing between the resilient means and their adjacent power surfaces to thereby calibrate the system to an anticipated torque.

5. Apparatus for sensing the tangential driving force between a driving shaft and a driven shaft jointly rotatable about an axis of rotation including:
   power imparting means securable with respect to the driving shaft, at a predetermined radial distance from, and adapted to apply a tangential force with respect to, the axis of rotation;
   power receiving means securable with respect to the driven shaft at a radial distance equal to said predetermined distance from, and adapted to receive a tangential force with respect to, the axis of rotation;
   load cell means positioned at the interface between the power imparting and power receiving means to drivingly couple the power means and to sense directly the tangential driving force therebetween during rotation of the shafts;

wherein the adjacent ends of the shafts are formed with flanges perpendicular to the axis of rotation, with one of the shafts supporting radially outwardly extending teeth with their radial edges constituting one of the power transmitting and receiving means and with the flange of the other of the shafts coupleable to an intermediate member, the intermediate member being formed with radially inwardly extending teeth with their radial edges constituting the other of the power receiving and transmitting means; and, wherein the intermediate member includes an inboard plate removably coupled to an inboard face of the intermediate member, the inboard plate having outboardly extending finger means to limit the axial inboard movement of the other of the shafts.

6. The apparatus as set forth in claim 5 wherein the intermediate member includes an outboard plate removably coupled to an outboard face of the intermediate member, the outboard plate having inboardly extending finger means to limit the axially outboard movement of the other of the shafts.

7. The apparatus as set forth in claim 6 and further including resilient means located at interfaces between the power imparting means and power receiving means resisting the movement of the load cells and power means into operative engagement.

8. The apparatus as set forth in claim 7 wherein the resilient means are U-shaped and further including pin means extending through the outboard plate and the inboard plate and adjacent to a bight of the resilient means for retaining the resilient means in position.

9. The apparatus as set forth in claim 8 and further including shim means positionable between the resilient means and an adjacent power means for calibrating the resilient means.

10. A method of measuring the torque between a driving shaft and a driven shaft axially aligned and rotating together about a common axis of rotation comprising the steps of:

providing a plurality of power imparting surfaces secured with respect to the driving shaft at an equal predetermined radial distance from the axis of rotation;

providing a plurality of power receiving surfaces secured with respect to the driven shaft at a radial distance equal to the predetermined distance from the axis of rotation;

positioning a predetermined number of load cells at interfaces between the power imparting surfaces and the power receiving surfaces to sense directly the tangential driving force therebetween; including removably inserting load cells into recesses adjacent the power imparting surfaces, the load cells being of a predetermined capacity as a function of the torque anticipated to be transmitted;

determining the torque at the interface between the driving shaft and the driven shaft during their rotation as a function of the predetermined distance, the predetermined number of load cells, and the sensed tangential driving force; and, resiliently biasing at least some of the power imparting surfaces and power receiving surfaces away from each other whereby the load cells begin to function only after a predetermined torque has been transmitted.

11. The method as set forth in claim 10 wherein the step of resiliently biasing includes selectively varying the spacing between the surfaces for calibration purposes.

* * * * *